US010853918B2

(12) United States Patent
Ho et al.

(10) Patent No.: US 10,853,918 B2
(45) Date of Patent: Dec. 1, 2020

(54) FOVEAL ADAPTATION OF TEMPORAL ANTI-ALIASING

(71) Applicant: Sony Interactive Entertainment Inc., Tokyo (JP)

(72) Inventors: Chris Ho, San Mateo, CA (US); Andrew Young, San Mateo, CA (US); Jeffrey Roger Stafford, Redwood City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/792,688

(22) Filed: Oct. 24, 2017

(65) Prior Publication Data

US 2018/0357752 A1  Dec. 13, 2018

Related U.S. Application Data

(60) Provisional application No. 62/517,833, filed on Jun. 9, 2017.

(51) Int. Cl.
*G06T 5/00* (2006.01)
*G06F 3/01* (2006.01)
(Continued)

(52) U.S. Cl.
CPC ............. *G06T 5/002* (2013.01); *G06F 3/013* (2013.01); *G06F 3/147* (2013.01); *G09G 5/377* (2013.01);
(Continued)

(58) Field of Classification Search
CPC .......... G06F 3/013; G06F 3/147; G09G 5/377
See application file for complete search history.

(56) References Cited

U.S. PATENT DOCUMENTS 6,466,206 B1 * 10/2002 Deering .................... G06T 5/20
345/419
6,664,955 B1 * 12/2003 Deering ................ G06T 3/4007
345/418

(Continued)

OTHER PUBLICATIONS

International Search Report PCT/US2018/036568, dated Sep. 13, 2018, 4 pages.

*Primary Examiner* — Michael Le
(74) *Attorney, Agent, or Firm* — Penilla IP, ACP

(57) ABSTRACT

Methods and systems are provided for enabling foveal adaption of temporal anti-aliasing within a foveated rendering presentation. A method for rendering a multi-resolution scene with anti-aliasing within a head mounted display (HMD) is provided. The method includes an operation for rendering a scene that includes a series of video frames. The method also includes operations for applying anti-aliasing to a first region of the scene using a first jitter offset and applying anti-aliasing to a second region of the scene using a second jitter offset. Further, the method provides for generating a foveated scene that includes the first region and the second region and for sending the foveated scene to be displayed on a display associated with the HMD, wherein the first region is associated with a higher resolution than the second scene and the first jitter offset is smaller than the second jitter offset, according to certain embodiments.

24 Claims, 15 Drawing Sheets

(51) Int. Cl.
*G09G 5/377* (2006.01)
*G06F 3/147* (2006.01)
*G09G 5/391* (2006.01)

(52) U.S. Cl.
CPC .............................. *G06T 2200/12* (2013.01); *G06T 2207/10016* (2013.01); *G06T 2207/20182* (2013.01); *G09G 5/391* (2013.01); *G09G 2340/0407* (2013.01); *G09G 2340/125* (2013.01); *G09G 2340/14* (2013.01)

(56) References Cited

U.S. PATENT DOCUMENTS

| | | | |
|---|---|---|---|
| 9,261,959 B1 | 2/2016 | D'Amico et al. | |
| 2014/0247277 A1* | 9/2014 | Guenter | G06T 11/40 345/611 |
| 2015/0379674 A1* | 12/2015 | Golas | G06T 1/60 345/426 |
| 2016/0085302 A1* | 3/2016 | Publicover | G06F 3/0304 345/633 |
| 2016/0307297 A1* | 10/2016 | Akenine-Moller | G06T 3/403 |
| 2017/0169602 A1* | 6/2017 | Blackmon | G06T 15/005 |
| 2017/0200308 A1* | 7/2017 | Nguyen | G06T 15/005 |
| 2017/0263046 A1* | 9/2017 | Patney | G06F 3/013 |
| 2018/0081429 A1* | 3/2018 | Akenine-Moller | G06T 15/005 |
| 2018/0224935 A1* | 8/2018 | Thunstrom | G09G 3/003 |
| 2018/0284872 A1* | 10/2018 | Schluessler | G06F 1/3218 |

\* cited by examiner

Distance away from foveal region or point of gaze (arbitrary units)

FOVEAL ADAPTATION OF TEMPORAL ANTI-ALIASING

CLAIM OF PRIORITY

This application is a non-provisional of U.S. Provisional Patent Application No. 62/517,833, filed on Jun. 9, 2017, entitled "FOVEAL ADAPTION OF TEMPORAL ANTI-ALIASING," which is hereby incorporated by reference.

FIELD OF THE DISCLOSURE

The present disclosure relates to virtual reality (VR) environment content presented in head mounted displays (HMDs), and methods and system for anti-aliasing of foveated rendered VR scenes.

BACKGROUND

Virtual reality (VR) presented through head mounted displays (HMDs) is becoming a more and more popular way for consumers to interact with various types of content. Not dissimilar to computer generated imagery displayed on computer monitors, VR scenes that are presented to users via HMDs may be affected by aliasing. In the context of computer graphics, aliasing may cause jagged or saw-toothed edges of curved or diagonal lines on a display or viewport. Generally speaking, aliasing detracts from the realism in computer generated scenes and certain anti-aliasing techniques have been developed to reduce distortion and artifacts associated with aliased scenes. Temporal anti-aliasing is one of these anti-aliasing techniques.

When temporal anti-aliasing is used within a scene defined by foveated rendering in which a foveal region may be rendered at a higher resolution than a peripheral region(s) (e.g., non-foveal regions), aliasing may occur to a greater degree in the peripheral region(s). Aliasing within peripheral region(s) may detract from an overall VR experience because the human visual system (e.g., peripheral vision or non-foveal vision) may still be tuned to detect artifacts caused by aliasing that appears in peripheral region(s). Current anti-aliasing techniques are not able to address this greater extent of aliasing in peripheral region(s) as compared that of foveal regions.

It is in this context that embodiments arise.

SUMMARY

Embodiments of the present disclosure provide methods and systems for enabling foveal adaptation of temporal anti-aliasing within foveated rendering displays and/or views. In one embodiment, a method is provided for rendering a multi-resolution scene with anti-aliasing within a head mounted display (HMD) that includes an operation for rendering a scene including a series of video frames. The method also provides operations for applying anti-aliasing to a first region of the scene using a first jitter offset and applying anti-aliasing to a second region of the scene using a second jitter offset. Furthermore, the method provides an operation that generates a foveated scene including the first region and the second region of the scene. The method additionally provides an operation for sending the foveated scene for display on a display that is associated with the HMD. According to certain embodiments, the first region is associated with a higher resolution than the second region. In one embodiment, the first jitter offset that is applied to the first region is smaller than the second jitter offset that is applied to the second region, according to some embodiments.

In another embodiment, a method for providing a virtual reality (VR) scene with anti-aliasing on a head mounted display (HMD) includes generating the VR scene that includes a foveal region and a peripheral region(s). The method also provides operations for anti-aliasing the VR scene, which includes obtaining a transformation matrix for a vertex within the VR scene and determining a location of the vertex within the VR scene, and selecting, by a vertex shader, a jitter component to be applied to the vertex, wherein a first jitter component is selected if the vertex is determined to be located within the foveal region of the VR scene and a second jitter component is selected if the vertex is determined to be located within the peripheral region(s) of the VR scene. According to this and other embodiments, the method further includes operations for applying the selected jitter component to the transformation matrix of the transformation matrix of the vertex for an anti-aliased VR scene as well as operations for sending the anti-aliased VR scene for display on a display associated with the HMD.

In yet another embodiment, a computer program embedded in a non-transitory computer-readable storage medium is included for providing a VR scene with anti-aliasing for presentation on an HMD. The computer program includes program instructions for rendering a VR scene that includes a foveal region and a peripheral region(s). Further, the computer program includes program instructions for applying anti-aliasing to the foveal region using a first jitter offset for anti-aliasing the foveal region and for applying anti-aliasing to the peripheral region(s) using a second jitter offset for anti-aliasing the peripheral region(s). According to this and other embodiments, the computer program also includes program instructions for sending the VR scene having the anti-aliased foveal region and the anti-aliased peripheral region(s) for presentation on a display associated with the HMD, wherein a resolution associated with the foveal region is greater than a resolution associated with the peripheral region(s), and wherein the first jitter offset is smaller than the second jitter offset.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1A:
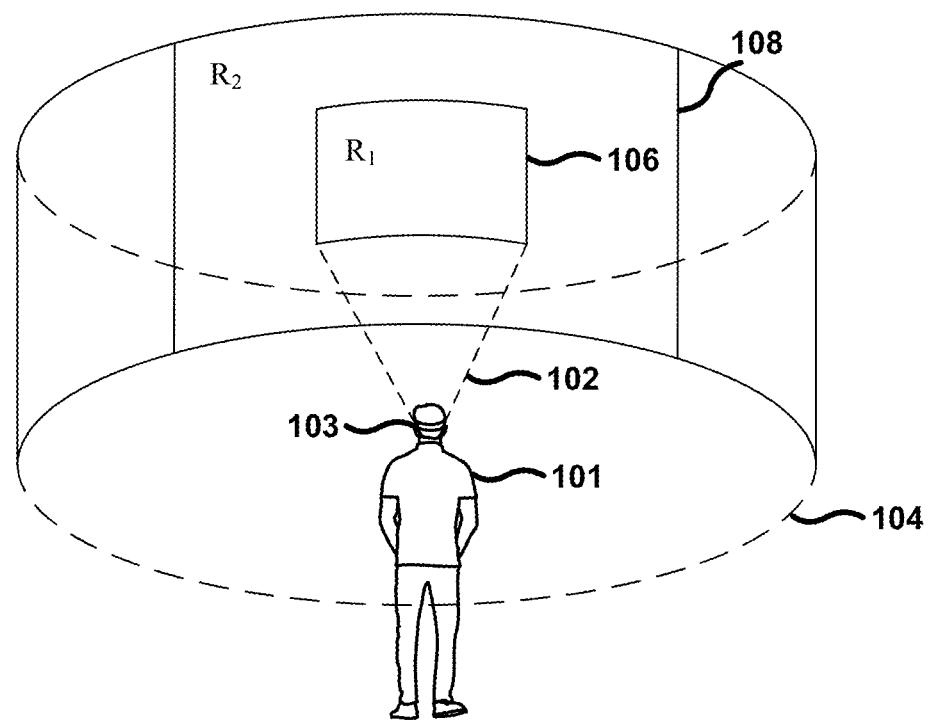
FIGS. 1A and 1B show an HMD user being presented with virtual reality (VR) content having two resolutions, in accordance with one embodiment.

The following embodiments describe methods, computer programs, and apparatus for adapting temporal anti-aliasing (TAA) techniques for foveated rendering systems. It will be obvious, however, to one skilled in the art, that the present disclosure may be practiced without some or all of these specific details. In other instances, well known process operations have not been described in detail in order not to unnecessarily obscure the present disclosure.

Virtual reality (VR) environments provided by HMDs are an increasingly popular medium for consumers to interact with content and for content creators to deliver content to consumers. Moreover, as VR scenes are becoming more complex and being displayed at higher resolutions, there is an associated increase in computational and networking cost. As a result, improvements to current methods of computer graphics rendering and anti-aliasing for VR scenes displayed via HMDs would be of benefit with respect to both computational and networking resources, as well as to the VR experience for the end user.

One way of lowering the computational and networking cost (as well as associated latency) of rendering a particular VR scene is to display the VR scene using foveated rendering. In accordance with one embodiment, foveated rendering may define areas within the display that are displayed at a higher resolution, quality, level of detail, sharpness, frame rate, etc. than other areas. According to these and other embodiments, areas having a higher resolution (or higher quality, level of detail, sharpness, frame rate) may be referred to as a foveal region or foveated area. Additionally, areas that do not have a higher level of resolution may be referred to as peripheral regions or areas, or non-foveal regions or areas.

For some embodiments, foveal regions may be fixed or static with respect to the display. In such embodiments, the foveal region may be positioned towards a center of the screen or display. In other embodiments, the foveal region may be positioned dynamically with respect to the screen or display. For example, in some embodiments, the foveal region may move within the display or screen in a predetermined manner, or as programmed by software. In other embodiments, a dynamic foveal region may track or follow a user's point of gaze (POG) or direction of gaze. As a result, areas within the display that correspond to the user's POG may be rendered at a higher quality, level of detail, and/or sharpness than areas that are farther away from the user's POG without necessarily being detrimental to the user's visual experience.

In some embodiments, one or more peripheral regions will be defined by foveated rendering to be within the screen or display where the foveal region is not located. For example, if a foveal region is located toward the center of the display, then the peripheral region(s) occupy the remainder of the display that is toward the periphery of the display (or at least a portion thereof). If the foveal region is to move to a different region of the display, then the peripheral region(s) should fill in the remainder of the display where the foveal region is not currently located. According to some embodiments, the peripheral regions may be referred to as non-foveal or non-foveated regions.

Figure 1B:
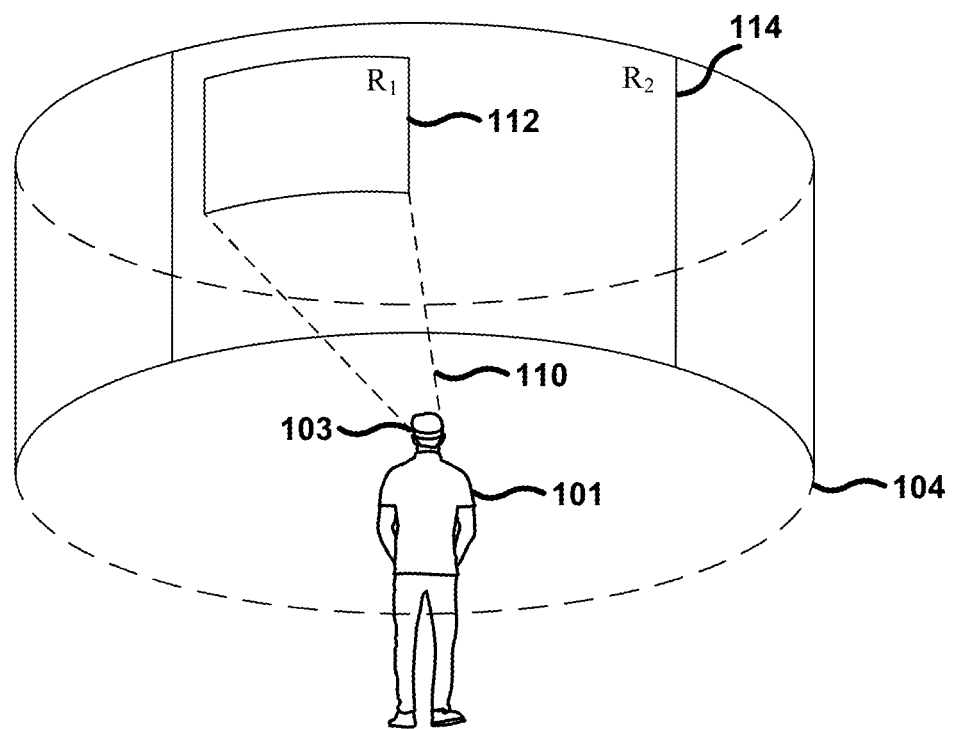

FIGS. 1A and 1B show an HMD user 101 being presented with virtual reality (VR) content within a VR environment 104 having two resolutions, $R_1$ and $R_2$. According to the embodiment shown in FIG. 1A, HMD user 101 is shown to have a gaze 102 that is being directed substantially straight ahead. That is, HMD user 101 is shown to be looking forward within the VR environment 104 that may encompass 360 horizontal degrees.

According to the embodiment shown in FIGS. 1A and 1B, the gaze HMD user 101 is being tracked by gaze detection components (not shown) located within the HMD/computing system 103 that is worn by HMD user 101. In some embodiments, gaze information may be obtained via cameras that located within the HMD that capture images of a user's eyes. The images may then be analyzed to determine a user's point of gaze or direction of gaze (e.g., where a user is currently looking). As a result, the HMD/computing system 103, having real time information on the HMD user's 101 gaze 102, is able to provide a foveal region 106 that is aligned with the gaze 102 of HMD user 101. For example, the foveal region 106 is shown to have a placement within the VR environment 104 that is a similar direction relative to the HMD user 101 as is the gaze 102 of HMD user 101. Additionally, the foveal region 106 is shown to have a resolution of $R_1$.

Also shown in FIG. 1A is a peripheral region 108. As mentioned above, the peripheral region 108 may be defined by a foveated rendering method or system to be regions within a display or field of view that does not coincide with foveal regions, according to some embodiments. For example, peripheral region(s) may be outside of a foveal region, or may surround a foveal region, or may fill in remaining spaces of a display that is not associated with foveal regions. Furthermore, non-foveated may be defined by a lower resolution, quality, level of detail, sharpness, frame rate, etc.

Thus, according to certain embodiments, the peripheral region 108 may include a region of the VR environment 104 that is displayed to the HMD user 101 but that does not correspond to the gaze 102 of the HMD user 101 as detected by the HMD/computing device 103. As a result, the peripheral region 108 may be displayed to the HMD user 101 at a resolution $R_2$ that is different from the resolution $R_1$.

According to some embodiments, resolution $R_1$ may be higher than $R_2$ for a given VR scene. In these embodiments, the foveal region 106 may be provided with higher resolution than the peripheral region 108 without being detrimental to the visual experience for the HMD user 101. Generally speaking, the human visual system is only able to perceive finer detail within a region that is associated with about a 5 horizontal degrees and about 5 vertical degrees relative to a point of gaze. This region of the visual field projects onto a region within the retina referred to as the fovea. As angular distance away from the user's central direction or point of gaze increases, there is a steep decline in visual acuity (e.g., the ability to perceive fine detail). This physiological phenomenon is referred to herein as foveation.

Foveated rendering leverages the phenomenon of foveation by providing configurations, formats, and paradigms of rendering, post-rendering, and/or processing of graphics for display where one or more regions (e.g., foveal region) is defined by higher level of resolution, a higher level of detail, a higher level of texture, and/or a higher level of sharpness than other regions. According to some embodiments, the foveal region is made to correspond to a region of a display that a user is currently looking or predicted to be looking. In other embodiments, a foveal region may be placed in a central region of the display in a static manner where a user will spend a substantial amount of time looking towards. Also, as mentioned previously, foveated rendering may define non-foveal (e.g., peripheral) regions that correspond to regions of the display where a user is not gazing at or predicted to gaze at. As used herein, non-foveated regions of display may be referred to as peripheral regions. However, it is also noted that foveated regions may be rendered or placed in regions of a display that are toward or proximate to the periphery of the display. Moreover, peripheral regions of a foveated rendering display are not necessarily located or placed toward or proximate to the periphery of the display, although they may be.

Embodiments contemplated here are enabled to use foveated rendering display configurations by rendering and/or displaying higher quality (e.g., resolution, level of detail (LOD), sharpness, frame rate) content within regions of a display that are associated with a field of view under user foveation (e.g., the center of gaze and surrounding fields that project onto a user's fovea). Additionally, embodiments contemplated here are enabled to display content having a lower quality in regions of the display that are not associated with the user's center of gaze, (e.g., the user's peripheral vision field). As a result, only a portion of a given scene may be rendered and/or processed to be displayed at high quality or high resolution under foveated rendering as compared to rendering an entire display or screen at full quality or full resolution.

One of the technological benefits of foveated rendering is the ability to reduce computational and networking cost associated with rendering a given scene at full quality (e.g., high resolution, sharpness, level of detail, frame rate, etc.) for the entire display (e.g., every pixel on display). By rendering only a portion (e.g., 20-50%, 5-75%, 25-40%) of the full display at high resolution and/or quality, computational resources (e.g., GPU, CPU, cloud computing resources) and networking resources (e.g., transmitting data to and from the HMD from a computing device, and/or transmitting data from a combined HMD/computing device to remote servers) may be reduced and allocated for other uses.

According to another embodiment, even if a GPU associated with an HMD/computing device generates full resolution video frames for a given scene, foveated rendering methods and/or systems may enable a reduction in an amount of data that is needed for displaying the scene on the HMD. For example, if the GPU is associated with a computing device that is connected wirelessly to the HMD, then foveated rendering methods and/or systems described here may enable a reduction in an amount of wireless data that is transmitted to the HMD from the computing device for presenting certain regions of the scene.

According to the embodiment shown in FIG. 1A, foveal region 106 represents about 30% of the total displayed or viewable area. The remainder of the total displayed area is represented by peripheral region 108. Although foveal region 106 is shown to be rectangular in shape for the sake of clarity, it should be noted that foveal region 106 may take on any number of shapes without departing from the spirit and scope of the embodiments. Some of the contemplated embodiments are described below with reference to FIGS. 3A-3F. Again, although the foveal region 106 is shown to represent 30% of the total displayable or viewable area, the foveal region 106 may range anywhere from 5% to 75% of the total displayable or viewable area in other embodiments.

In one embodiment, it is contemplated that the peripheral region 108 may have a resolution $R_2$ that is less that the resolution $R_1$ of the foveal region 106 for at least some period of the VR scene. For example, if $R_1$ is equivalent to 1920×1080 pixels (e.g., 1080p), $R_2$ may be equivalent to 960×540 pixels (e.g., 540p), or roughly half the number of vertical pixels and half the number of horizontal pixels. As a result, the foveal region 106 having a resolution $R_1$ of 1080(p) may be associated with an image resolution equivalent to about 2.074 megapixels. In contrast, the peripheral region 108 having a resolution $R_2$ of 540(p) may be associated with an image resolution that is equivalent to about 0.518 megapixels, demonstrating a difference in image resolution of a factor of about 0.25 with respect to resolution $R_1$.

According to another embodiment, it is contemplated that foveal region 106 may be associated with a resolution $R_1$ of 3840×2160p (4K UHD) whereas the peripheral region 108 may be associated with a resolution $R_2$ that is less than 4K UHD, for example, 1080(p), 540(p), 360(p), 240(p), etc. There are any number of other resolutions that may be used in other embodiments according to the methods and systems presented here. As non-delimiting examples, it is contemplated that the foveal region 106 may have a resolution $R_1$ that is characterized by the following resolutions: 2160× 1200 (or 1080×1200 per eye), 1280×720 (HD), 1600×900 (HD+), 1920×1080 (FHD), 2560×1440 ((W)QHD), 3200× 1800 (QHD+), 3840×2160 (4K UHD), 5120×2880 (5K UHD+), 7680×4320 (8K UHD), etc.

According to some embodiments, the resolution $R_2$ may be characterized by any resolution that is less than that of $R_1$. As non-limiting examples, $R_2$ may be characterized by the following resolutions: 320×240 (240p), 640×360 (nHD, 360p), 960×540 (qHD, 540p), 1280×720 (HD, 720p), 1600× 900 (HD+), and so on. It is contemplated that $R_1$ and $R_2$ may change throughout the course of a VR scene and/or between different VR scenes, depending on the various embodiments.

FIG. 1B illustrates the HMD user 101 directing his gaze 110 toward the upper left-hand corner of the VR environment 104. According to some embodiments, gaze 110 is detected by HMD/computing device 103, which is then enabled to provide foveal region 112 within the VR environment 104 at a location that corresponds with gaze 110. That is, the gaze 110 is being tracked by HMD/computing device 103 in real time, and, as a result, HMD/computing device 103, is able to determine where to foveate the VR environment such that the foveal region 112 is in the same direction as the center of gaze associated with gaze 110. Thus, there is a transitioning between the location of foveal region 106 in FIG. 1A to a new location associated with the foveal region 112 of FIG. 1B that tracks or traces the change between gaze 102 of FIG. 1A and gaze 110 of FIG. 1B.

Although certain embodiments have been shown to have a dynamic foveal region that tracks a user's gaze direction, other embodiments may include a fixed foveal region that does not track a user's gaze direction.

Figure 2A:
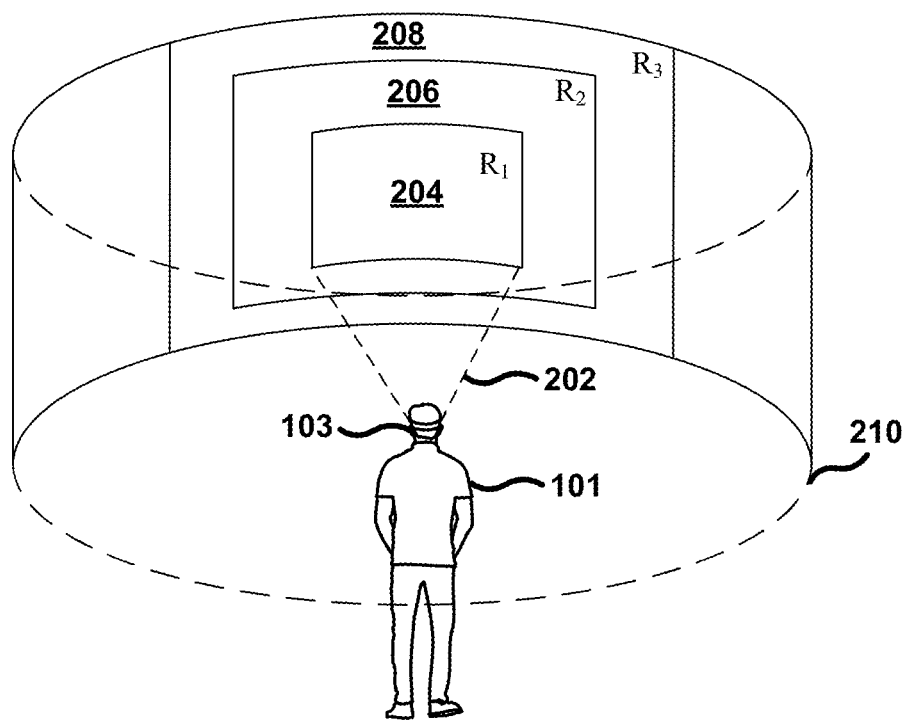
FIGS. 2A and 2B show an HMD user being presented with VR content having a foveal region, an intermediate foveal region, and a peripheral region, in accordance with certain embodiments.

FIG. 2A shows an HMD user 101 being presented with VR content within VR environment 210 having a foveal region 204, an intermediate foveal region 206, and a peripheral region 208. It is contemplated that some embodiments may have a foveal region 204 with a resolution $R_1$ that is greater than the resolution $R_2$ of the intermediate foveal region 206. Furthermore, according to some embodiments, it is contemplated that resolution $R_2$ is to be greater than resolution $R_3$ of the peripheral region 208. Also, similar to the embodiments shown in FIGS. 1A and 1B, the foveal region 204 is shown in FIG. 2A to occupy a region within the VR environment 210 that coincides with the instantaneous gaze 202 of HMD user 101. However, as mentioned earlier, other embodiments may implement foveated rendering in which the foveal region 204 and the intermediate foveal region 206 are fixed relative to the display area and need not track a user's gaze direction.

According to the embodiment shown in FIG. 2A, the intermediate foveal region 206 generally surrounds a region occupied by the foveal region 204 within the VR environment 210. As a result, the intermediate foveal region 206 may coincide with a region within the VR environment 210 that is associated with an angular distance away (eccentricity) from the central gaze of about 5° to about 60°. Visual acuity associated with this space in the visual field (e.g., intermediate foveal region) is less than that of the foveal region, but may still be greater than that of the peripheral region (e.g., having an eccentricity of greater than about 60° relative to the center of the gaze direction). As a result, method and systems described herein are enabled to provide an intermediate foveal region 206 having a resolution that is in between that of the foveal region 204 and the peripheral region 208.

According to one embodiment, foveal region 204 may have a resolution $R_1$ that is characterized by 1080p, while intermediate foveal region 206 may have a resolution $R_2$ that is characterized by 720p, and the peripheral region 208 may be characterized by 540p. These resolutions are only examples, and it is envisioned that the foveal region 204 may take on higher resolutions, e.g., 4K, 8K, 16K, etc. In these and other embodiments, the intermediate foveal region 206 may have a resolution that is less than that of the foveal region 204, while the peripheral region 208 will have a resolution that is less than that of the intermediate foveal region 206.

It is also contemplated that the intermediate foveal region 206 is to occupy a space within the VR environment 210 that is in between the foveal region 204 and the peripheral region 208 with respect to a radial axis extending from a center of the foveal region toward 206 the periphery of the VR environment 210. It is also contemplated that the intermediate foveal region 206 and the peripheral region 208 tracks or follows the gaze 202 of HMD user 101 or tracks or follows the foveal region 204 within the VR environment 210. That is, the intermediate foveal region 204 and the peripheral region 208 are also enabled to translocate within VR environment 210 so as to move with or appear to move with the foveal region 204 in real-time or near real-time.

Figure 2B:
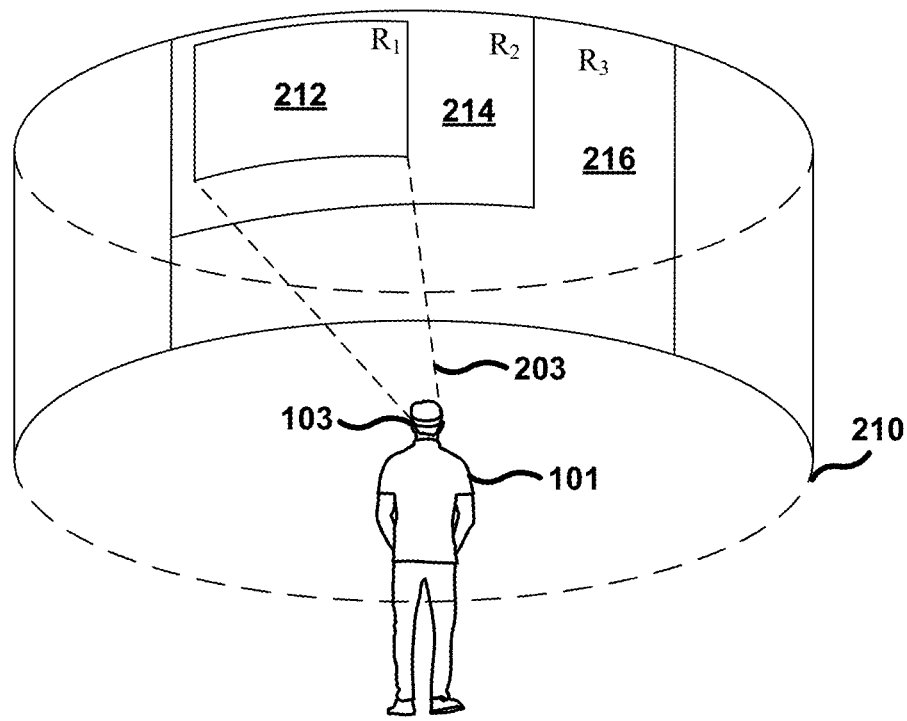

FIG. 2B shows that HMD user 101 has changed from a gaze 202 that is directed substantially straight ahead in FIG. 2A to a gaze 203 that is directed to an upper left-hand corner of the VR environment 210. According to some embodiments, gaze 203 is tracked by HMD/computing system 103 via gaze detection, and, as a result, HMD/computing system 103 is enabled to position foveal region 212 in a similar direction that gaze 203 is directed to. HMD/computing system 103 is also enabled to place the intermediate foveal region 214 at a location within VR environment 210 that surrounds a region that the foveal region 212 occupies.

As noted above, the foveal region 212 may be made to correspond to about 5-75% of a visual field of HMD user 101, or to 5-75% of the total displayable space within the VR environment 210. Further, the intermediate foveal region 214 may correspond to about, for example, another 5-50% of the visual field of HMD user 101 or to about 5-50% of the total viewable area of VR environment 210, depending on various embodiments. Peripheral region 216 may, as a result, correspond to anywhere between 40-90% of the total visual field and/or the total viewable area of the viewable area. It is contemplated, however, that the proportion of the visual field and/or the viewable area of VR environment 210 that is allocated to each of the foveal region 212, intermediate foveal region 214, and peripheral region 216, may change within VR scenes or between different VR scenes, depending on various embodiments.

Figure 3A:
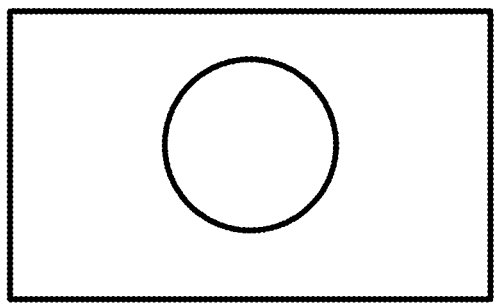
FIGS. 3A-3H show various embodiments of foveated rendering views.
Figure 3B:
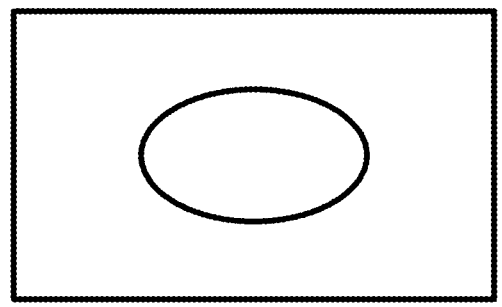
Figure 3C:
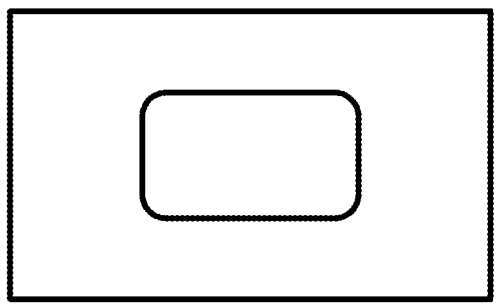

FIGS. 3A-3H show various embodiments of foveated rendering views. For example, FIG. 3A illustrates a foveated rendering display having a foveal region that is characterized by a circular boundary. FIG. 3B illustrates a foveated rendering view that may be used with methods and systems described here having a foveal region that is characterized by an ellipsoidal, or oblong, or oval shape. Further, FIG. 3C shows an embodiment of a foveated rendering configuration where a foveal region is shown to be a rectangular shape with rounded corners.

Figure 3D:
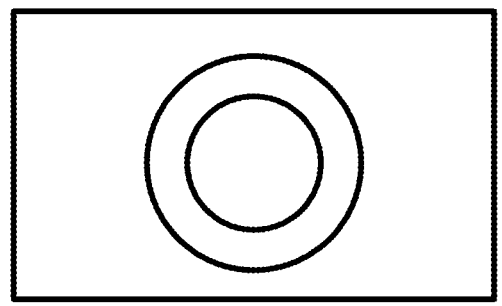
Figure 3E:
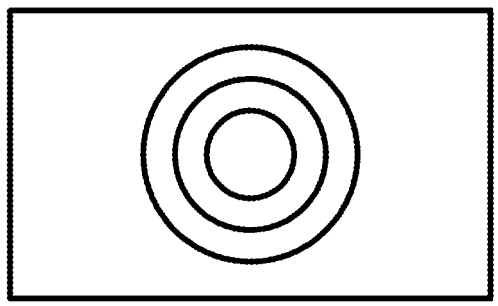

FIGS. 3D and 3E illustrate embodiments of foveated rendering views having foveal regions that are circular. FIG. 3D additionally shows an intermediate foveal region, also circular in shape, which lies outside of the foveal region in between the foveal region and the peripheral region(s). Moreover, FIG. 3E illustrates two intermediate foveal regions that are arranged in a nested manner. It is contemplated that, generally, any number of intermediate foveal region may be utilized with various embodiments, with each successive intermediate foveal region that is farther and farther away from the foveal region having a progressively lesser quality (e.g., lesser resolution, sharpness, level of detail, frame rate, refresh rate) associated with it. It is further contemplated that although intermediate foveal regions are shown to be of a similar shape as a given foveal region within a foveated rendering display, this similarity does not need to be the case in other embodiments. For example, the intermediate foveal regions of FIGS. 3D and 3E may be characterized by shapes other than circles.

Figure 3F:
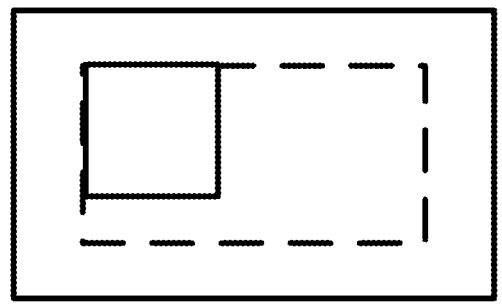

FIG. 3F shows an embodiment of a foveated rendering view and/or display having a dynamic foveal region that is bounded by a box. In these and other embodiments, the foveal region may track a user's gaze such that the foveal region is shown within an area of the display and/or view that coincides with a gaze direction of an HMD user as long as the user's gaze remains within a certain area that is characterized by the bounded box. As a result, the foveal region may track the gaze of the user up until the gaze moves outside of the bounded box. According to some embodiments, the foveal region may still attempt to track a gaze that is outside of the bounded box by translocating to a position within the bounded box that is determined to be closer to the gaze than other locations. Of course, the geometries and shapes shown in FIGS. 3A-3F are meant to be exemplary and not limiting. For example, any number of other shapes or boundaries may be used to define foveal regions and/or intermediate foveal regions in accordance with methods and systems described here, including squares, trapezoids, rhombuses, and other polygons.

Generally speaking, each of the embodiments shown in FIGS. 3A-3E may have either foveal regions that are 'fixed' relative to the display and/or view or that dynamically track a gaze of a user when viewing the respective foveated rendering views and/or displays. For example, for certain types of VR content, it may be the case that the HMD user is expected to be looking straight ahead for a majority of a VR session. As a result, certain embodiments may use foveated rendering views and/or displays that are fixed relative to the display and/or view of the VR environment.

Figure 3G:
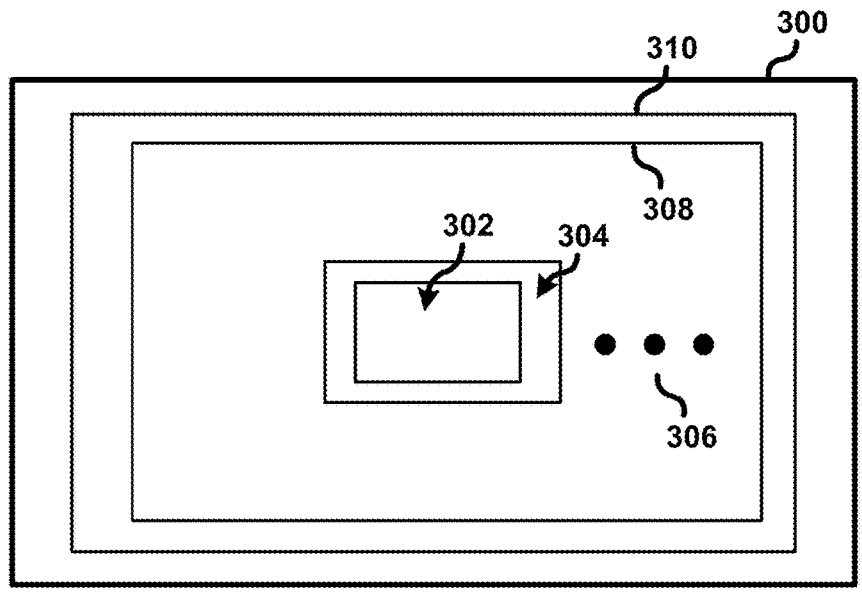

FIG. 3G illustrates a VR scene 300 produced using foveated rendering according to the methods and systems described here. The foveated rendering produces a foveal region 302 and a number of intermediate foveal regions 304-310. The number of intermediate foveal regions 304-310 is arbitrary in FIG. 3G, with each intermediate foveal region having successively reduced resolutions as the intermediate foveal region is displayed farther and farther away from the foveal region. For example, intermediate foveal region 306 may include anywhere between 1 and 100 additional intermediate foveal regions.

Figure 3H:
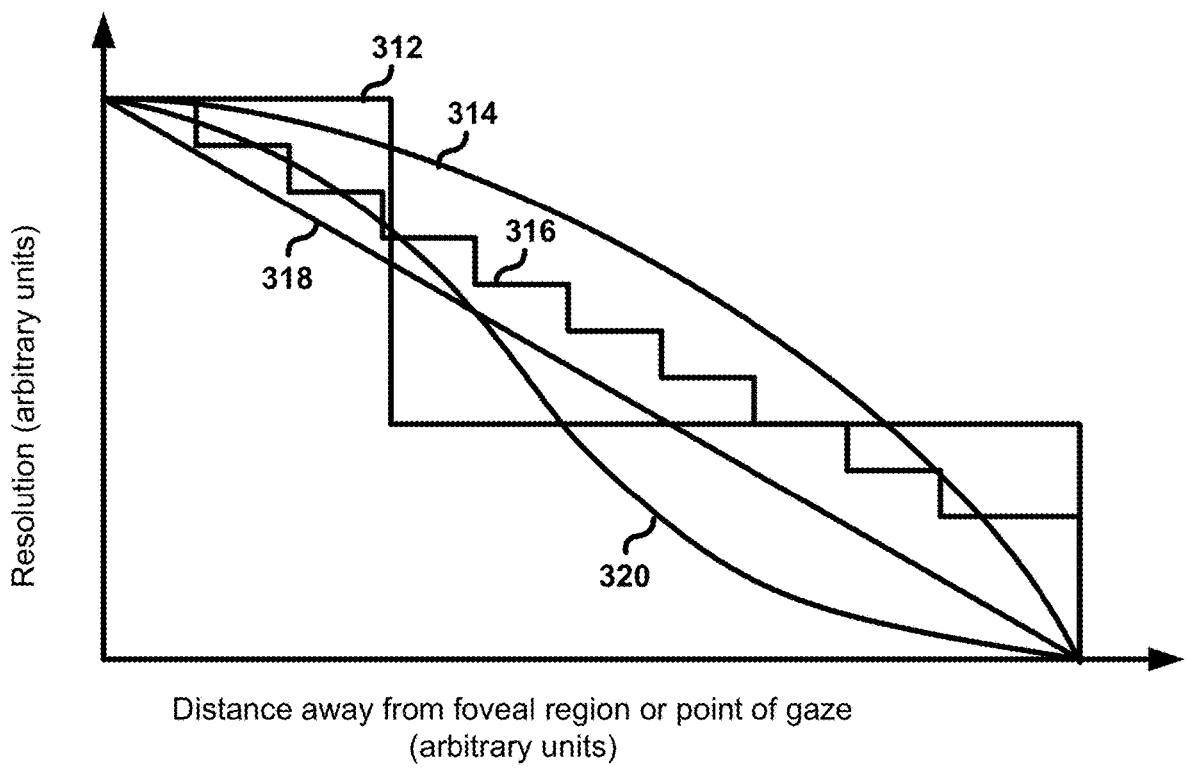

FIG. 3H describes various exemplary relationships between a resolution for a region of display and the region's distance away from a foveal region or a point of gaze. For example, curve 312 might describe a foveated rendering display having only a foveal region and a peripheral region. Curve 314 describes a foveated rendering display having a parabolic relationship between resolution and a distance away from the foveal region. Curve 316 describes a step function that reduces in resolution as a distance away from the foveal region increases. Moreover, curves 318 and 320 describe a linear and sigmoidal relationship between resolution and distance away from the foveal region. As a result, foveated rendering system contemplated here are capable of rendering any number of intermediate foveal regions having various resolutions as each intermediate foveal region is further removed from the foveal region.

Figure 4:
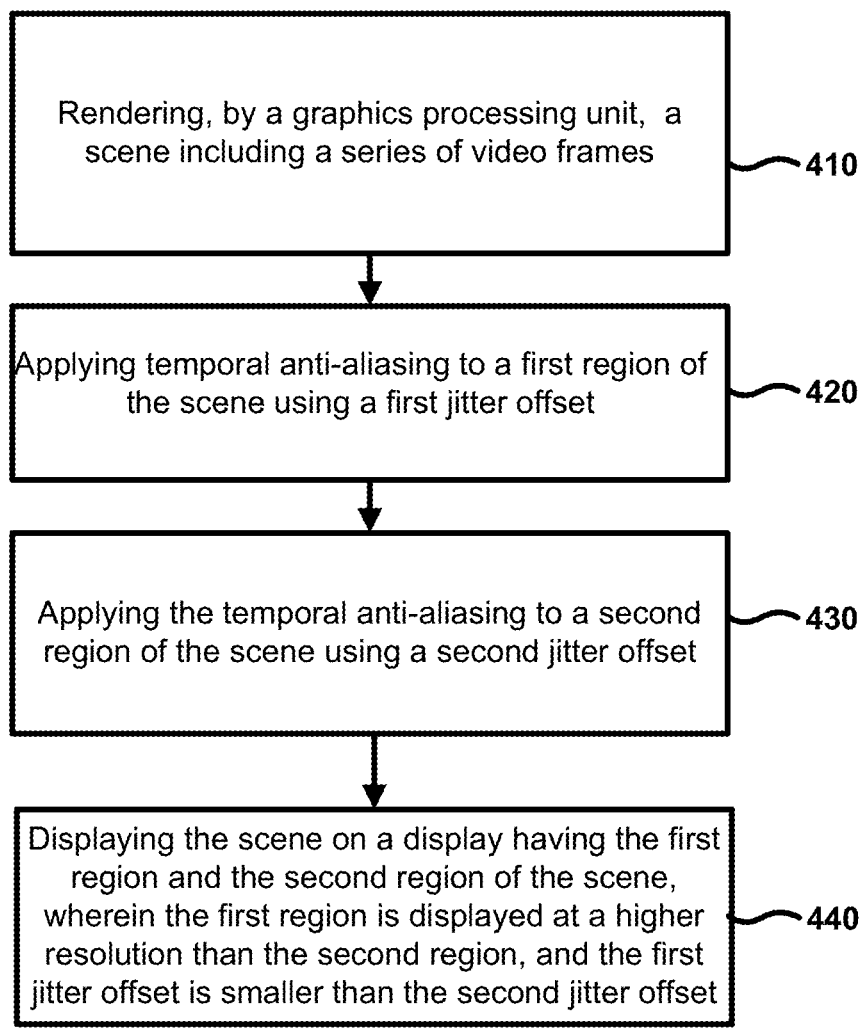
FIG. 4 shows an overall flow of a method for anti-aliasing a multi-resolution VR scene, in accordance with one embodiment.

FIG. 4 shows an overall flow of a method for anti-aliasing a multi-resolution VR scene. According to the embodiment shown, operation 410 serves to render a scene that includes a series of video frames. Typically, this is performed using a graphics processing unit (GPU). The method then flows to operation 420, which serves to apply temporal anti-aliasing to a first region of the scene using a first jitter offset. Operation 430 then serves to apply the temporal anti-aliasing to a second region using a second jitter offset. Further, the method then flows to operation 440, which functions to display the scene on a display having both the first and second regions of the scene, wherein the first region is displayed or associated with a higher resolution than the second region and the first jitter offset is smaller than the second jitter offset.

According to some embodiments, the first region of operation 420 may correspond to a foveal region within a foveated rendering display and/or view, while the second region 430 may correspond to a peripheral region within the foveated rendering display and/or view. For example, the first region may have a resolution that is an equivalent of 1080p whereas the second region may have a resolution that is an equivalent of 540p.

Temporal anti-aliasing describes a computational process of removing or reducing visual artifacts associated with aliasing of images within a scene. One of the ways temporal anti-aliasing is able to reduce aliasing of images within scenes is to perform sub-pixel sampling using a jitter of the sampling location over two or more frames.

Embodiments in accordance with the method shown in FIG. 4 are enabled to perform temporal anti-aliasing that is adapted to the particular resolutions of different regions within a scene by using different jitter offsets for those different regions associated with different resolutions. For example, a region having a higher resolution (e.g., foveal region) may be applied with temporal anti-aliasing with a smaller jitter offset, whereas a region with a lower resolution (e.g., peripheral region(s)) may be applied with temporal anti-aliasing with a larger jitter offset. By using a larger jitter offset for regions having a lower resolution (and larger pixel sizes), there a reduced likelihood that primitives or fragments within those regions will be lost, as may be the case if a smaller jitter offset were used. As a result of the embodiments that are practiced in accordance with the method of FIG. 4, there is an increased effectiveness of anti-aliasing for the second region (e.g., the peripheral region(s)).

Figure 5:
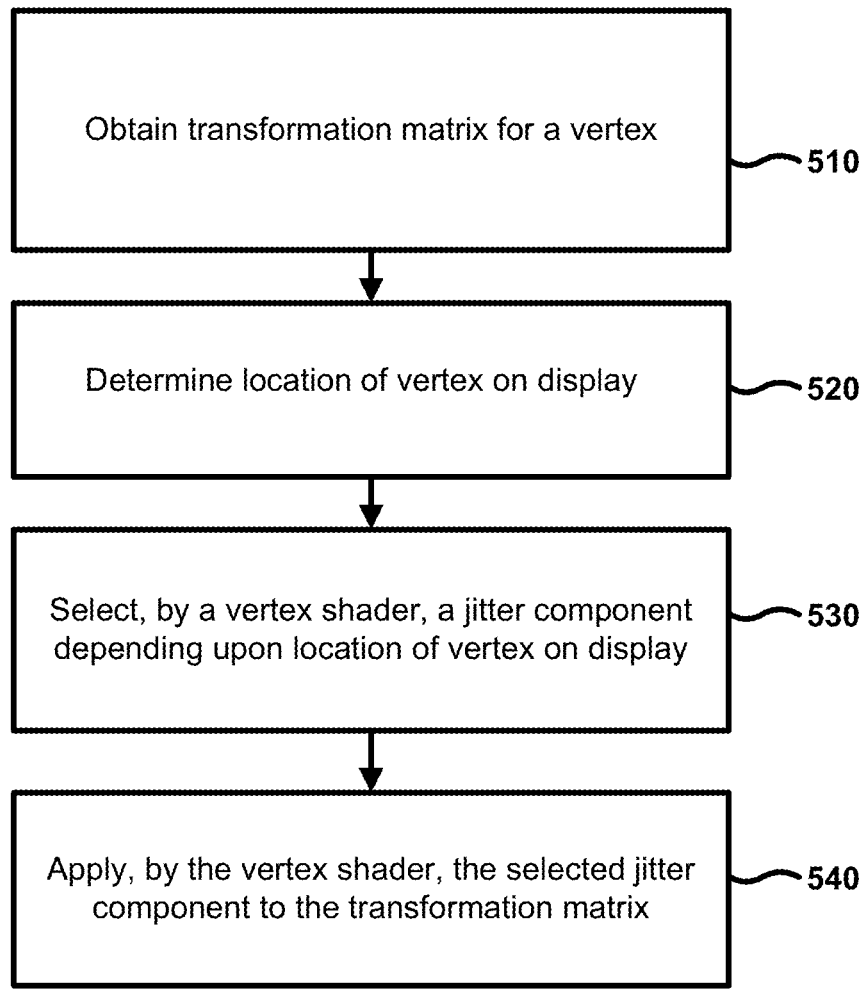
FIG. 5 shows an overall flow of a method for enabling a vertex shader to select different jitter offsets depending upon vertex location, in accordance with one embodiment.

FIG. 5 shows an overall flow of a method for enabling a vertex shader to select different jitter offsets depending upon vertex location. Operation 510 of the method shown in FIG. 5 serves to obtain a transformation matrix having a jitter component. According to some embodiments, the transformation matrix may have been processed by a GPU and stored in a memory or buffer from which the transformation matrix is retrieved by operation 510. For example, the transformation matrix may be a model-view-projection (MVP) matrix that represents a vertex within a (VR) scene. The method the flows to operation 520, which serves to determine a location of the vertex on a display. For example, operation 520 may be able to determine whether the vertex is within a foveal region or a peripheral region(s).

The method then flows to operation 530, which is able to select a jitter component or jitter offset or jitter matrix depending on the location of the vertex that is determined by operation 520. According to some embodiments, jitter components or offsets or matrices may be stored in a memory, where it is retrievable by operation 530. The method shown in FIG. 5 then flows to operation 540, which serves to apply the selected jitter component or offset or matrix to the transformation matrix. Further, it contemplated that operations 510-540 may be carried out by a vertex shader within a graphics pipeline, according to some embodiments. In other embodiments, it is contemplated that the aforementioned operations are to be performed by a rasterizer.

According to some embodiments, a jitter component may be described or contained by a jitter matrix J or [J]. Thus, J may be applied to a given transformation matrix via matrix multiplication. As an example, a transformation matrix may be described by [MVP], where M represents a model, V represents a view, and P represents a projection. Thus, an operation defined by [MVP] [J] would be one way of applying jitter matrix [J] to the transformation matrix [MVP].

Figure 6A:
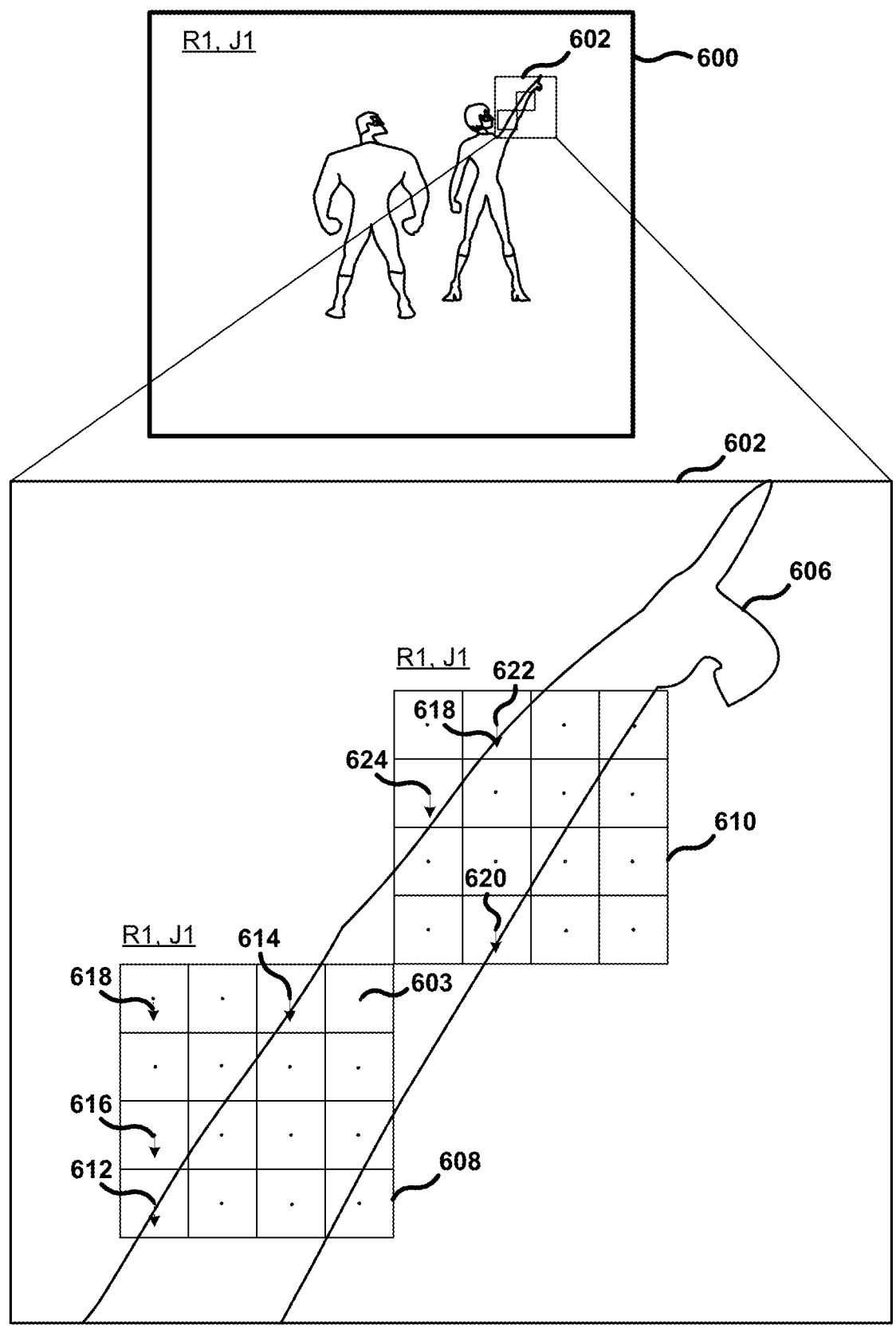
FIGS. 6A-6C shows various embodiments of sub-pixel sampling for two regions of a video frame, according to certain embodiments.

FIG. 6A shows an embodiment of sub-pixel sampling of two regions for a video frame 600. The video frame 602 is shown to be associated with a resolution $R_1$. A portion 602 of video frame 600 containing primitive 606 is shown in an exploded view, which includes a first region 608 and a second region 610. The first region 608 and the second region 610 are shown to include 16 sampling positions each. Each sampling position is shown to be associated with a pixel center for each respective pixel.

According to the embodiment shown, fragments of the primitive 606 cover 8 sampling positions within the first region 608, including, for example, sample position 603. Sample positions 612, 614, and 616 of the first region 608 are shown not be covered by fragments of primitive 606. However, once jittered by a jitter offset 618, sample positions 612 and 614 become covered by primitive 606. As a result, when a coverage mask for pixels associated with the sample positions 612 and 614 is generated by a rasterizer, there will be an indication that the fragments of primitive 606 may contribute to final colors of the pixels associated with sample position 612 and with sample position 614. However, primitive 606 will not contribute to the final color of the pixel associated with sample position 616 because fragments of the primitive 606 do not cover the sample position in for either a jittered or un-jittered sampling position.

Additionally, the second region 610 is shown to include 7 sample positions that are covered by primitive 606, including sampling position 620. Once the sampling positions in the second region are jittered by the jitter offset 618, sample position 622, which was not covered by primitive 606 before being jittered, is shown to now be covered by primitive 606. On the other hand, sample position 620, which was covered by primitive 620 at an un-jittered position, is no longer covered at a jittered position. As a result, the primitive 606 will contribute to the final colors of the pixels associated with sample positions 620 and 622.

Figure 6B:
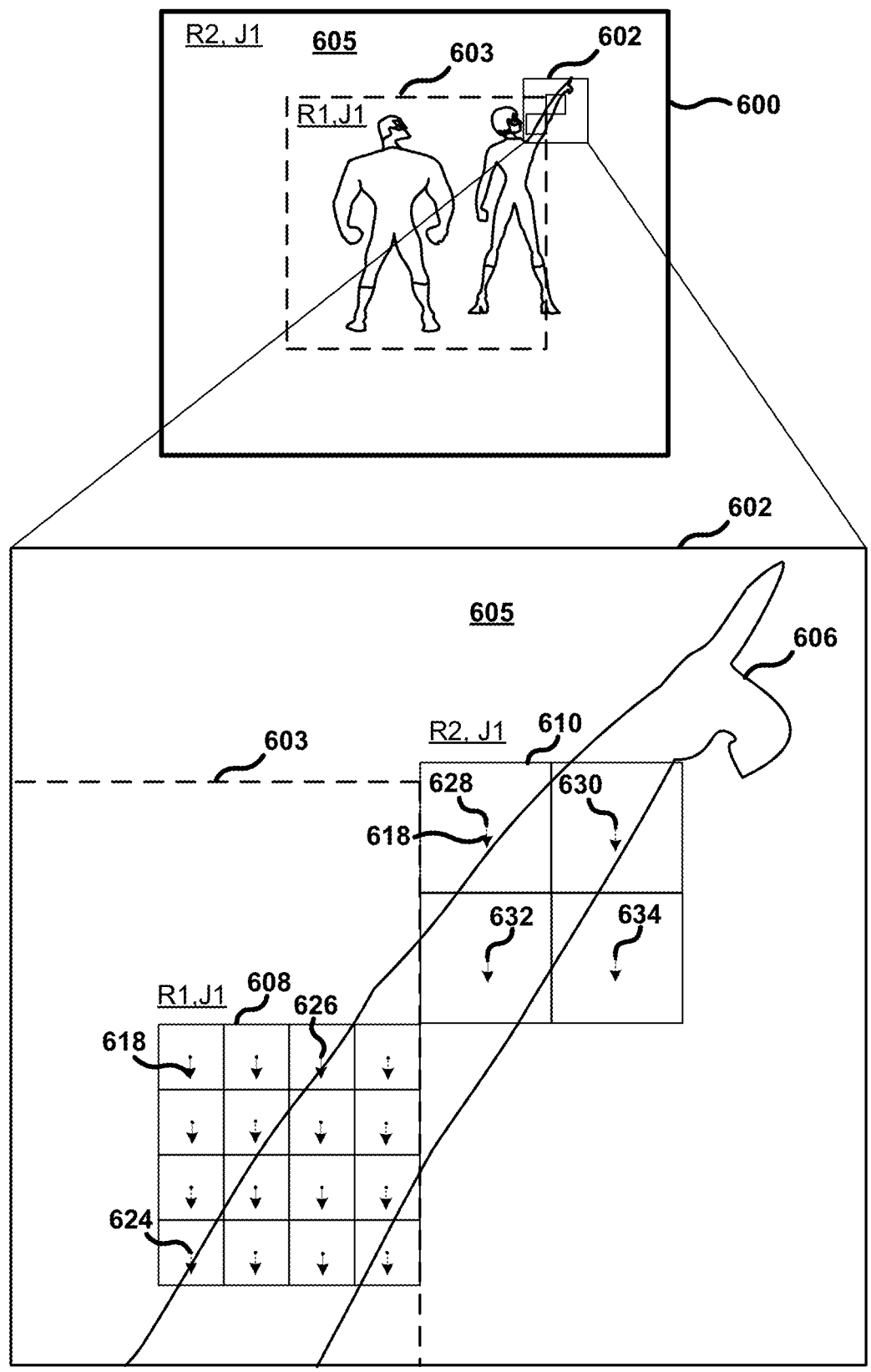

FIG. 6B shows an embodiment of a video frame 600 having a foveal region 603 that is associated with a resolution $R_1$ and a jitter component $J_1$, as well as a peripheral region 605 that is associated with a resolution $R_2$ and the jitter component $J_1$. Portion 602 is shown to include a first region 608 that falls within the foveal region 603 and also a second region 610 that falls within the peripheral region 605. As a result, the first region 608 includes a sampling pattern that is much like that shown in FIG. 6A.

In contrast, the second region 610, which is within the peripheral region 605, is shown to include a fewer number of sampling positions (e.g., four) due to the smaller resolution $R_2$ than $R_1$. For example, the second region is shown to include sample positions 628-634, with sample positions 630 and 632 being covered by primitive 606. Also shown in FIG. 6B is the same jitter component 618 being used for both the first region 608 and the second region 610, even though the second region has larger pixels and larger spacing in between sampling positions. As a result, jitter component 618 does not change the colors that contribute to the final color of any of the pixels associated with sample positions 628-634. For example, fragments associated with primitive 606 do not cover sample position 628 whether the position is jittered or not. As a result, primitive 606 may not contribute to the final color of the pixel associated with the sample position 628.

Figure 6C:
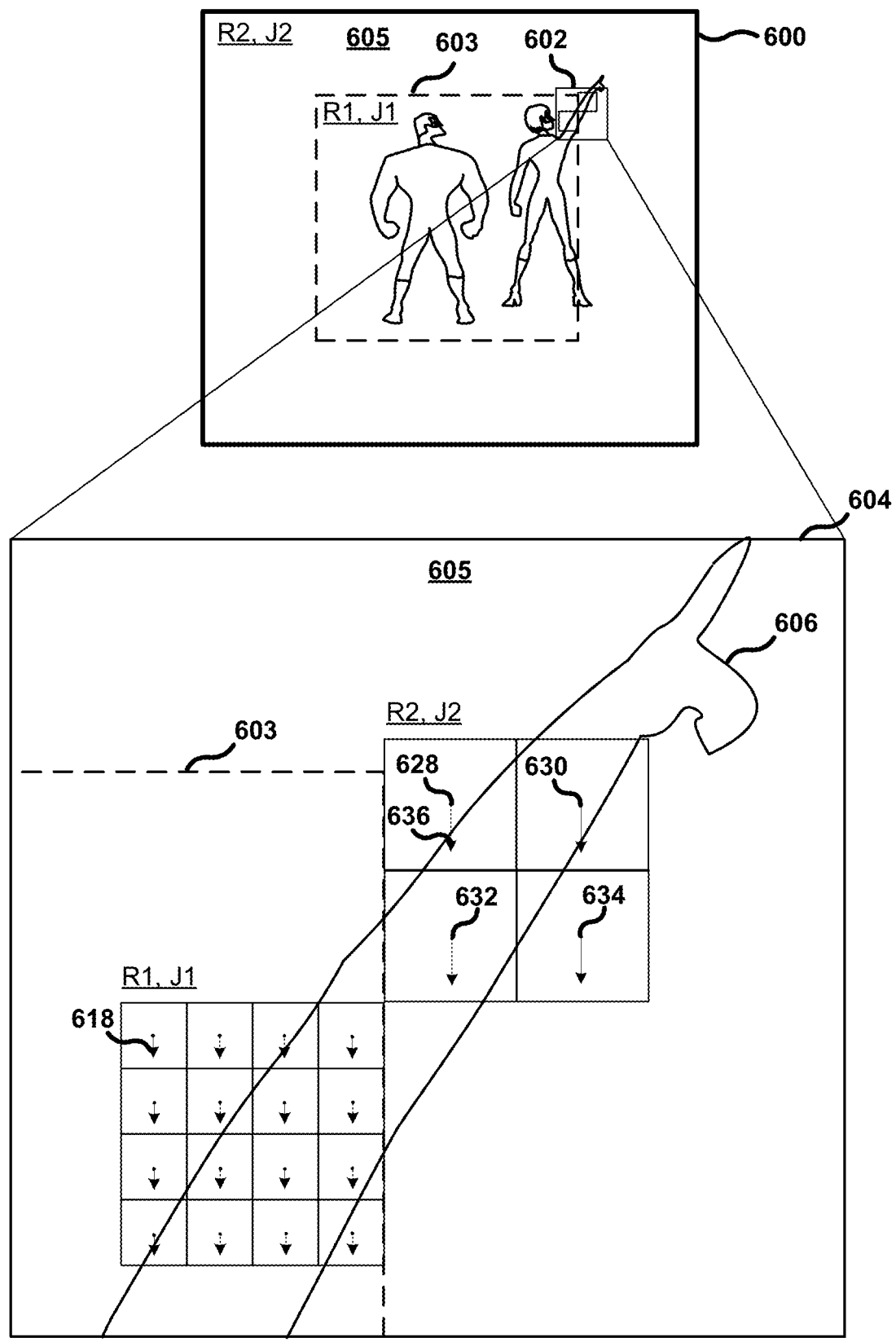

FIG. 6C shows an embodiment of sampling a video frame 600 having a foveal region 603 associated with a resolution $R_1$ and a jitter $J_1$, as well as a peripheral region 605 associated with a lower resolution $R_2$ and a larger jitter $J_2$. For example, $J_2$, depicted by jitter offset 636 is shown to be about twice the magnitude of $J_1$ jitter offset 618. As a result, fragments of primitive 606 are able to contribute to the pixel associated with sample location 628 because the jittered sample position 628 is covered by primitive 606. Thus the use of a $J_2$ jitter offset 636 for the peripheral region 605 results in an image with reduced aliasing for the peripheral region 605 as compared to the embodiment shown in FIG. 6B where a different jitter (e.g., $J_2$ jitter offset 636) was not used for the peripheral region 605 (e.g., because only a single jitter $J_1$ was used for both the foveal region 603 and the peripheral region 605).

Using a larger jitter component in regions within a display associated with smaller resolutions (e.g., larger distances between sampling points) reduces the likelihood that primitives or fragments will be lost. Thus, the method and system provided in accordance with the embodiments described here are able to provide enhanced anti-aliasing by selecting from different jitter offsets depending on whether the sampling position is within a foveated or peripheral region(s), which can effectively reduce aliasing, especially for non-foveated portions of images.

Figures 7A, 7B, 7C:
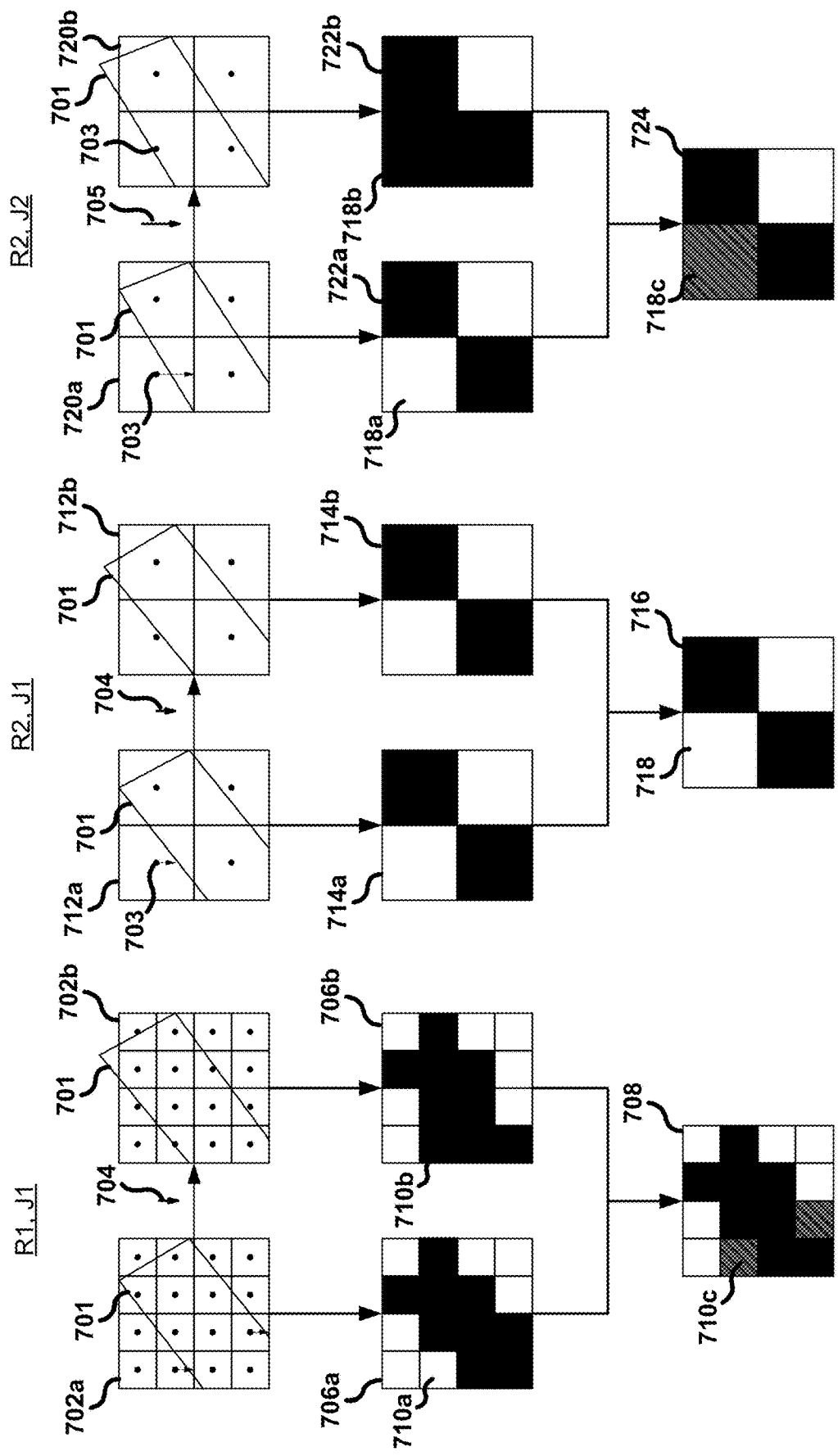
FIGS. 7A-7C show various embodiments of sampling, rasterizing, and shading for a given primitive, according to one embodiment.

FIGS. 7A-7C show various embodiments of sampling, rasterizing, and shading for a given primitive 701. For example, sampling grid 702a of FIG. 7A is shown to include a 16 sampling locations for fragments of primitive 701. Rasterized grid 706a is a result of coverage data this is produced by a rasterizer during scan conversion of a fragment formed by the intersection of sampling grid 702a and primitive 701.

Jittered sampling grid 702b is shown to have been jittered according to a jitter offset 704, which is rasterized into rasterized grid 706b. A pixel shader or compute shader may then combine rasterized grid 706a and rasterized grid 706b to produce shaded grid 708, which is a combination of the rasterized grids 706a and 706b. For example, the pixel shader or compute shader may choose a color for pixel 710c in the shaded grid 708 that is a combination or average of the color of pixel 710a and the color of pixel 710b.

In FIG. 7B, sampling grid 712a is shown to intersect with the primitive 701 having only 4 sampling points. Sampling grid 712a is representative of a sampling process for a display having a lesser resolution, for example, a peripheral region(s) of a foveated rendering view and/or display. Jittered sampling grid 712b is also shown to have the 4 sample points having been jittered according to a jitter offset 704. Because the jitter offset 704 represents a smaller proportion of the distance between sampling points in either of sampling grid 712a and sampling grid the rasterized grid 714b that is a result of the jittered sampling grid 712b is the same as the rasterized grid 714a produced by the un-jittered sampling grid 714a. That is, the amount of jitter offset used in the sampling process of FIG. 7B is not enough to make it so that fragments of primitive 701 cover sample point 703 in sampling grid 712a or sampling grid 712b. As a result, the shaded grid 716 is shown to be characterized by regular patterns that may go on to form jagged edges, or "jaggies," and will likely result in aliasing in a final image.

FIG. 7C shows a sampling grid 720a and a jittered sampling grid 720b that has been jittered to an extent of jitter offset 705 that is greater than jitter offset 704 of FIG. 7B. As a result, sample point 703 is covered by primitive 701 in jittered sampling grid 720b, but not in sampling grid 720a. This is reflected in the respective rasterized grids 722a and 722b. The resulting shaded grid 724 has a pixel 718c that is shaded with a color that may be the average or combination of the colors of pixels 718a and 718b. As a result, shaded grid 724 exhibits less of a jagged edge and/or regular pattern than does the shaded grid 716. As a result, a sampling process that is like the one shown in FIG. 7C provides a greater degree of anti-aliasing and a smaller likelihood that primitives will get lost.

Figure 8:
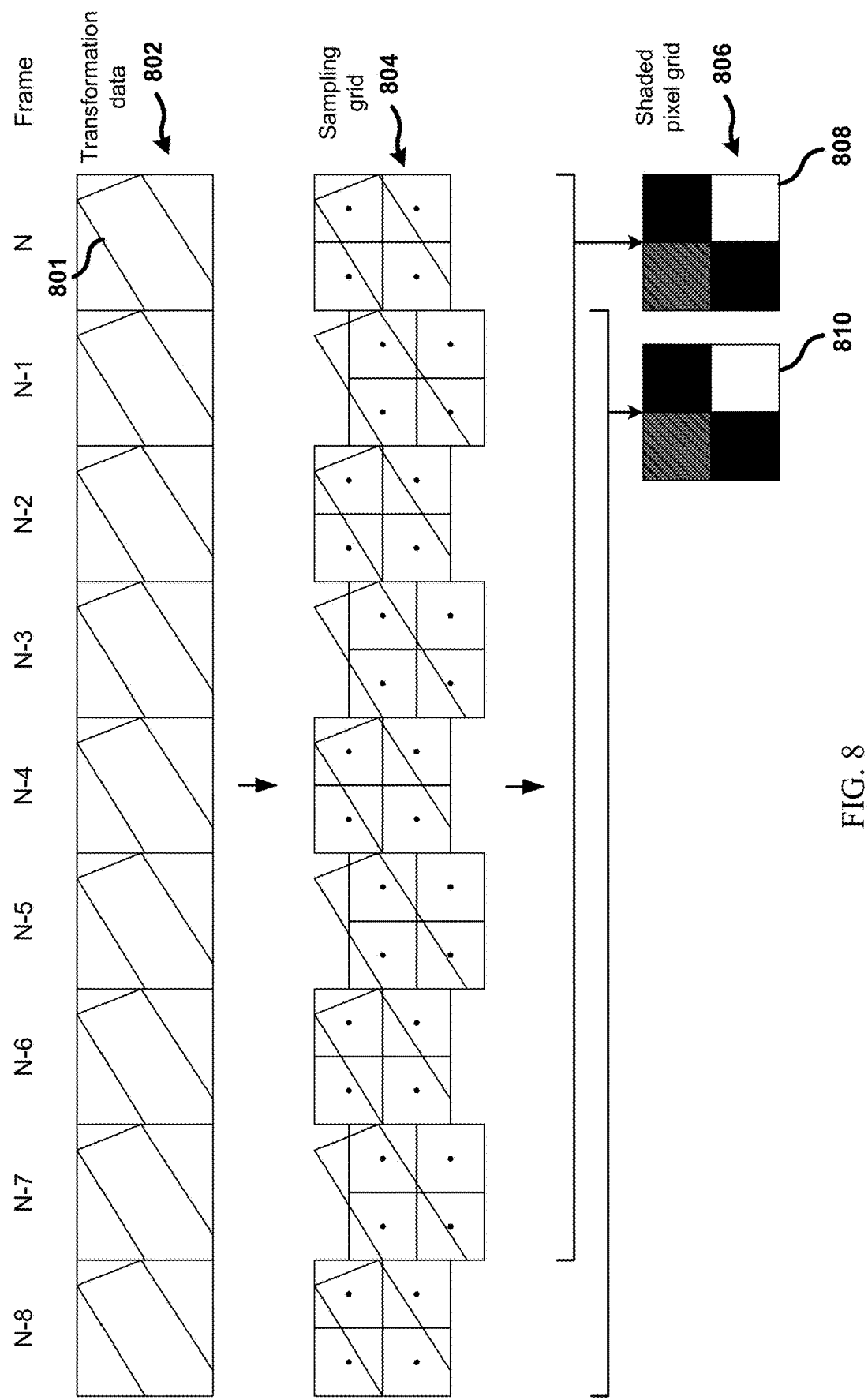
FIG. 8 shows a conceptual scheme for using temporal sampling for a given jitter, according to one embodiment.

FIG. 8 shows temporal aspects of anti-aliasing in accordance with certain embodiments. Primitive 801 is represented visually by transformation data 802 for frames N, N-1, . . . , N-8. Although primitive 801 is shown to have a similar shape and location for each of frames N, N-1, N-2, . . . , N-8 for the sake of clarity and illustrative purposes, primitive 801 need not have the same shape or position for other embodiments. According to some embodiments, transformation data 802 may be stored in a buffer.

Sampling grid 804 is shown to sample at 4 sampling locations for each frame for the transformation data 802. The sampling grids 804 are shown to be jittered for every other frame. Again, for the sake of clarity, sampling grids 804 are shown to be jittered by half a pixel in Y, although different jitter offsets may be used in accordance with various other embodiments. For example, other embodiments may use a jitter offset that is a quarter pixel in both X and Y. Moreover, according to some embodiments, the jittering shown by FIG. 8 may be performed by sample code that translates a projection matrix. For example, the sample code may apply a translation matrix to transformation data 802, which would effectively provide the jitter shown in FIG. 8.

Shaded pixel grid 806 is shown to include 4 pixels that depend on coverage data obtained through sampling grid 804 for the a current frame and 7 previous frames, according to some embodiments. For example, shaded pixel grid 808 is shown to be based on sampling data from frames N, N-1, . . . , N-7, while shaded pixel grid 810 is shown to be based on sampling data from frames N-1, N-2, . . . , N-8. As a result, a process of pixel shading (or compute shading) is temporally dependent on previous frames that are stored in a buffer. The resulting image that is formed by an accumulation of outputs from multiple frames provides a greater degree of anti-aliasing, especially for regions where distances between sampling points is greater (e.g., peripheral regions).

Figure 9A:
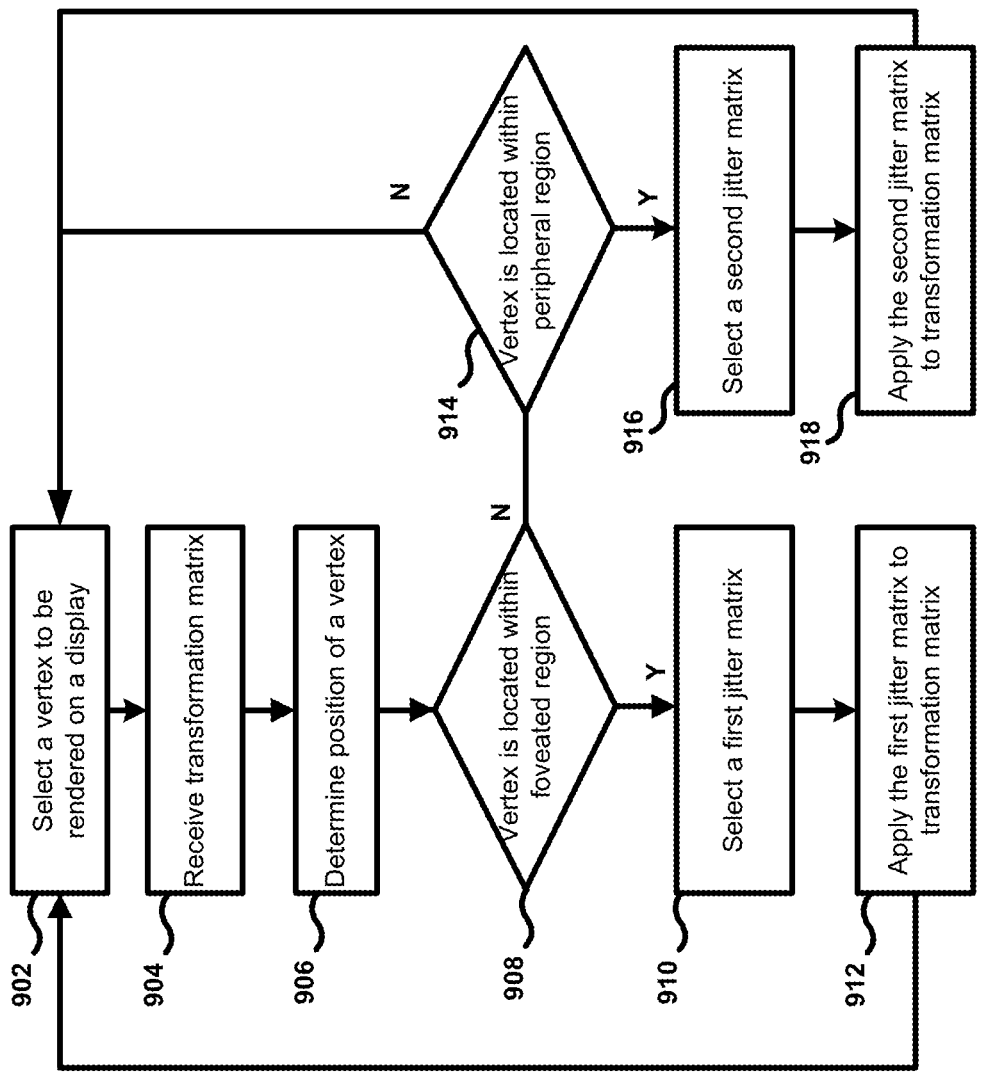
FIGS. 9A and 9B show embodiments of methods that are enabled select from different jitter matrices, according to certain embodiments.

FIG. 9A shows an embodiment of a method that enables variable selection of different jitter amounts, offsets, components (collectively definable in jitter matrices) for a foveal region and a peripheral region(s) within a foveated rendering view and/or display. Operation 902 serves to select a vertex to be rendered on a (VR) display. Operations 904 and 906 then obtain a transformation matrix defining the selected vertex and determine position information of the selected vertex via the transformation matrix. At operation 908, the method determines whether the vertex is located within a foveal region (e.g., a region having a relatively higher resolution). If the vertex is determined to be located within the foveal region, then operations 910 and 912 serve to select a first matrix and apply the first matrix, respectively. If the vertex is determined not to be located within the foveal region, but instead located within a peripheral region at operation 914, then the method flows to operations 916 and 918, which serve to select and apply a second jitter matrix.

As mentioned previously, the foveal region may have a resolution that is higher than the peripheral region(s). As a result, the first jitter matrix should include a jitter offset that is relatively smaller than that of the second jitter matrix. Moreover, it is contemplated that at least a portion of the operations shown in FIG. 9A is to be carried out by a vertex shader within a graphics pipeline, according to some embodiments.

Figure 9B:
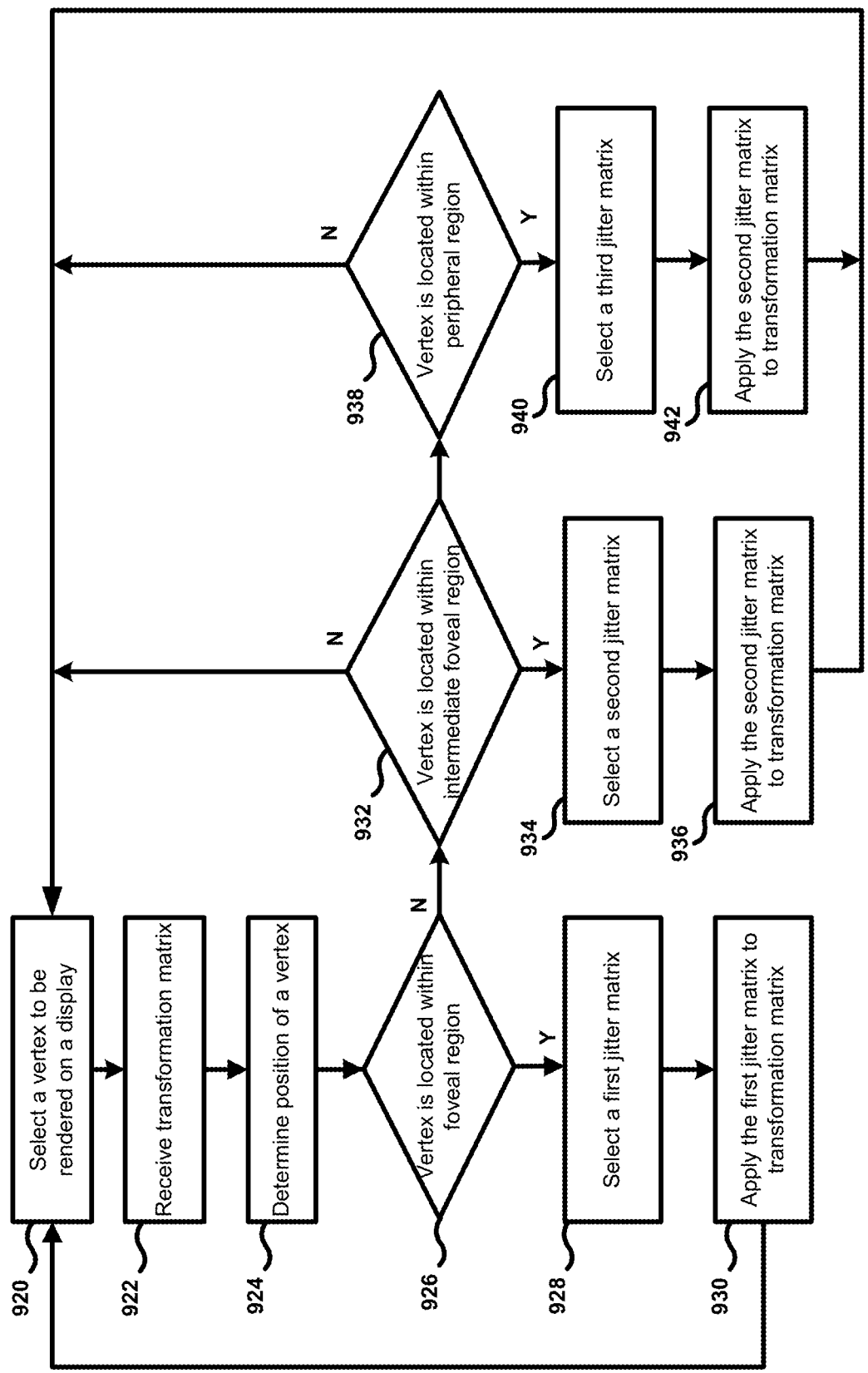

FIG. 9B shows an embodiment of a method that enables variable selection of different jitter amounts, offsets, components (collectively definable in jitter matrices) for a foveal region an intermediate foveal region, and peripheral region within a foveated rendering view and/or display. Operation 920 serves to select a vertex to be rendered on a (VR) display. Operations 922 and 924 then obtains a transformation matrix defining the selected vertex and determines position information of the selected vertex via the transformation matrix. At operation 926, the method determines whether the vertex is located within a foveal region (e.g., a region having a relatively higher resolution). If the vertex is determined to be located within the foveal region, then operations 928 and 930 serve to select a first jitter matrix and apply the first jitter matrix, respectively. If the vertex is determined not to be located within the foveal region, but instead located within the intermediate foveal region at operation 932, then the method flows to operations 934 and 936, which serve to select and apply a second jitter matrix, respectively. If the vertex is determined to not be located within the intermediate foveal region, but within the peripheral region(s) at operation 938, then the method flows to operations 940 and 942, which serve to select and apply a third jitter matrix, respectively.

As mentioned previously, the foveal region may have a resolution that is higher than either the intermediate foveal region or the peripheral region, while the intermediate foveal region may have a resolution that is higher than the peripheral region, according to some embodiments. As a result, the first jitter matrix should include a jitter offset that is relatively smaller than that of either the second or third jitter matrices, while the second jitter matrix should include a jitter offset that is relatively smaller than that of the third jitter matrix. Moreover, it is contemplated that at least a portion of the operations shown in FIG. 9B is to be carried out by a vertex shader within a graphics pipeline, according to some embodiments. In other embodiments, the operations depicted in FIG. 9B may be shared among a vertex shader, a rasterizer, or a pixel shader (or compute shader).

Figure 10:
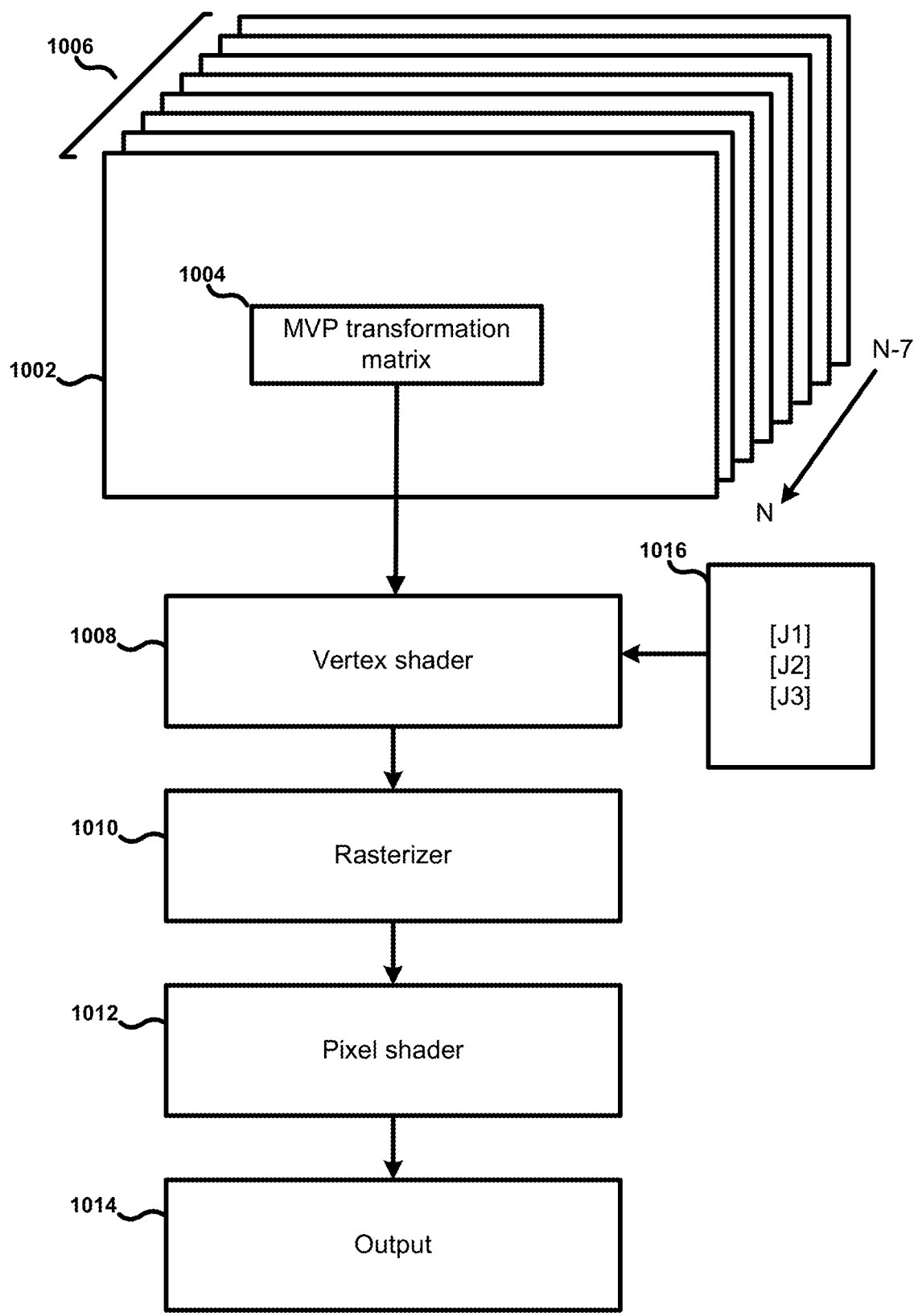
FIG. 10 illustrates an overall conceptual model of a graphics pipeline that is enabled to select from different jitter matrices for temporal anti-aliasing in accordance with foveated rendering, according to one embodiment.

FIG. 10 illustrates an overall conceptual model of a graphics pipeline that is enabled to select from different jitter matrices for temporal anti-aliasing under foveated rendering paradigms. For example, vertex shader 1008 is shown to obtain a transformation matrix 1004 from frame data 1002. According to some embodiments, the vertex shader 1008 is a computer program that is able to provide appropriate levels of lighting, coloring, and other post-processing effects for an image. After obtaining transformation matrix 1004 from frame data 1002, the vertex shader 1008 is able to determine a location of a given vertex that is described by the transformation matrix 1004. Depending upon the location of the vertex (e.g., whether the vertex is within a foveal region, an intermediate foveal region, or a peripheral region), the vertex shader 1008 will select from memory 1016 an appropriate jitter matrix, e.g., $[J_1]$, $[J_2]$, or $[J_3]$. Although three jitter matrices are shown to be stored in memory 1016, it is understood that any number of jitter matrices may be stored in memory 1016 and selected from depending upon the various embodiment without departing from the spirit and the scope of the embodiments.

Additionally, vertex shader 1008 may also obtain data (e.g., transformation matrices) from previous frame data 1006 (e.g., frames N-1, N-2, . . . , N-7) while applying an appropriate jitter matrix for each. The method then flows to rasterizer 1010, which is responsible for taking an image described by frame data 1002 and 1006 in vector graphics format and converting it into a raster image consisting of pixels. The rasterizer may be embodied by a computer program, according to some embodiments. The output of rasterizer 1010 is then fed to pixel shader 1012, which processes appropriate levels of color and other attributes to individual pixels. The resulting pixels produced by pixel shader 1012 are then fed into output 1014 for sending for display. It is noted that pixel shader is used to refer to either a pixel shader or a compute shader.

Figure 11:
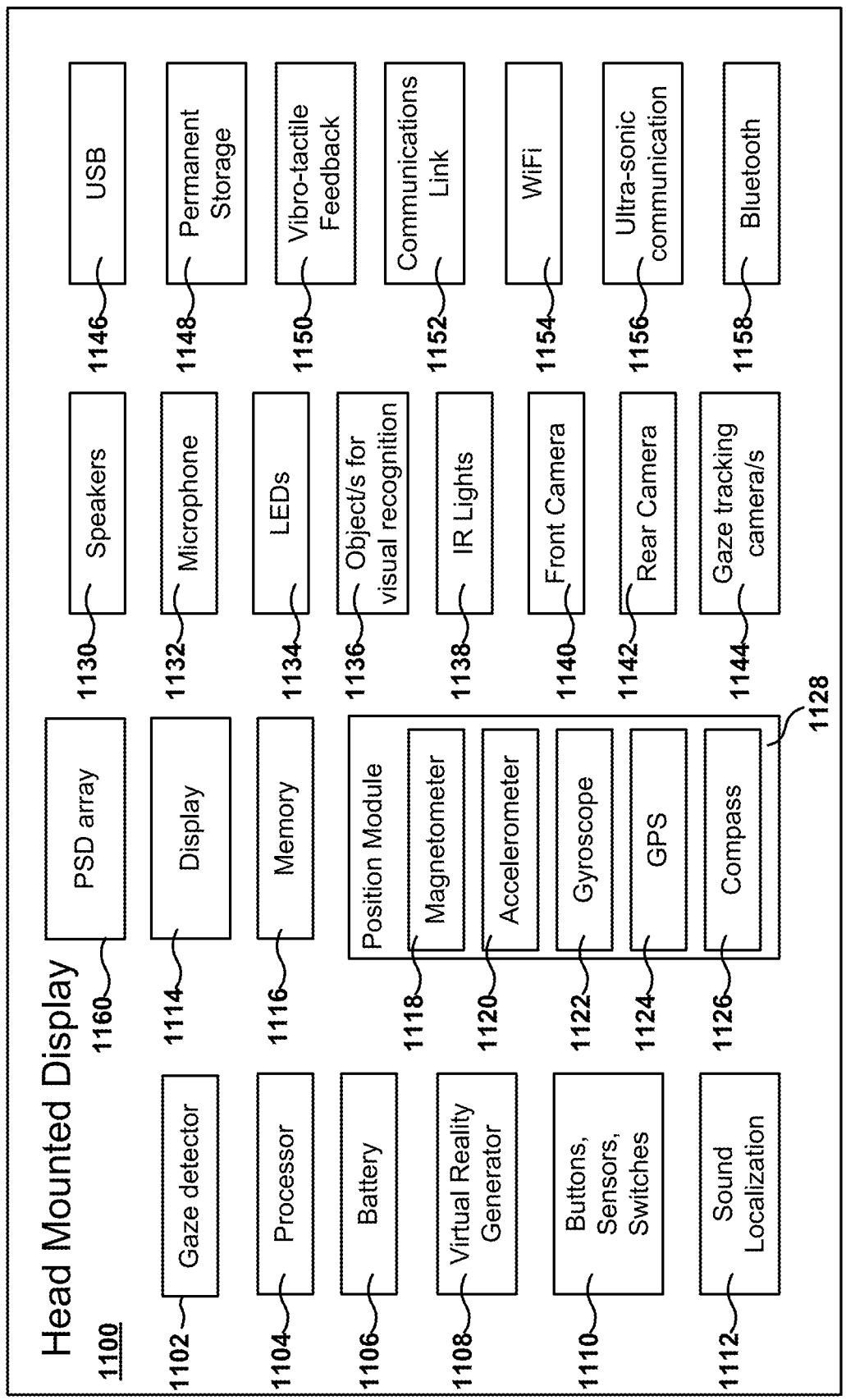
FIG. 11 illustrates an additional embodiment of an HMD that may be used with the presented method and/or system.

FIG. 11 illustrates an additional embodiment of an HMD 1100 that may be used with the presented method and/or system. HMD 1100 includes hardware such as a gaze detector 1102, a processor 1104, battery 1106, virtual reality generator 1108, buttons, sensors, switches 1110, sound localization 1112, display 1114, and memory 1116. HMD 1100 is also shown to include a position module 1128 that comprises a magnetometer 1118, an accelerometer 1120, a gyroscope 1122, a GPS 1124, and a compass 1126. Further included on HMD 1100 are speakers 1130, microphone 1132, LEDs 1134, object/s for visual recognition 1136, IR lights 1138, front camera 1140, rear camera 1142, gaze tracking cameras 1144, USB 1146, permanent storage 1148, vibro-tactile feedback 1150, communications link 1152, WiFi 1154, ultra-sonic communication 1156, Bluetooth 1158, and photo-sensitive diodes (PSD) array 1160.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the changing of VR operations are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for rendering a multi-resolution scene with temporal anti-aliasing within a head mounted display (HMD), comprising:
   rendering, using a graphics processing unit, a scene including a series of video frames, for each video frame,
      applying anti-aliasing to a first region of the video frame using a first jitter offset having a first magnitude;
      applying anti-aliasing to a second region of the video frame using a second jitter offset having a second magnitude, the first region having a higher resolution of pixels than the second region;
      generating a foveated scene that includes the first region of the video frame and the second region of the video frame; and
      sending the foveated scene for display on a display associated with the HMD, and the first magnitude of the first jitter offset is smaller than the second magnitude of the second jitter offset, and both the first jitter offset and the second jitter offset are applied to a transformation matrix used for anti-aliasing each one of the series of video frames,
   wherein the anti-aliasing for a current video frame of the series of video frames includes sampling from a plurality of previous video frames.

2. The method of claim 1, further comprising:
   tracking a gaze of a user of the HMD; and
   wherein said generating the foveated scene includes dynamically placing the first region within the display associated with the HMD in accordance with said tracking the gaze of the user.

3. The method of claim 1, further comprising:
   applying anti-aliasing to a third region of the scene using a third jitter offset, wherein said generating the foveated scene further includes the third region, the third region is associated with an intermediate resolution that is less than the higher resolution associated with the first region and higher than the resolution associated with the second region, and wherein the third jitter offset is greater than the first jitter offset and smaller than the second jitter offset; and
   wherein the said generating the foveated scene includes nesting the first region within the third region.

4. The method of claim 1, wherein said applying the anti-aliasing to the first region of the scene using the first jitter offset and said applying the anti-aliasing to the second region of the scene using the second jitter offset are performed by a compute shader.

5. The method of claim 1, wherein the first region of the scene is nested within the second region of the scene during said displaying the scene on a display for foveated rendering.

6. The method of claim 1, wherein the anti-aliasing for the current frame is performed by sampling code that translates a projection matrix associated with each of the plurality of previous video frames.

7. The method of claim 1, wherein the anti-aliasing for a video frame of the scene includes sampling from iteratively accumulated frame generated from previous results.

8. The method of claim 1, wherein the first region moves within the second region depending on a gaze direction of a user of the HMD.

9. The method of claim 1, wherein the anti-aliasing that is applied to the first region of the scene and the second region of the scene includes temporal anti-aliasing.

10. The method of claim 1, wherein higher resolution of pixels is associated with more pixels in said first region that will be exposed to the first jitter offset than pixels in said second region that are exposed to the second jitter offset.

11. A method for providing a virtual reality (VR) scene with temporal anti-aliasing for presentation on a head mounted display (HMD), comprising:
   generating, by a GPU, a VR scene including a series of video frames, the VR scene including a foveal region of the video frame and a peripheral region of the video frame;
   anti-aliasing the VR scene, wherein the anti-aliasing includes,
      obtaining a transformation matrix for a vertex within the VR scene and determining a location of the vertex within the VR scene,
      selecting, by a vertex shader, a jitter component to be applied to the vertex, wherein a first jitter component having a first magnitude is selected if the vertex is determined to be located within the foveal region of the VR scene and a second jitter component having a second magnitude is selected if the vertex is determined to be located within the peripheral region of the VR scene, the foveal region having a higher resolution of pixels than the peripheral region, and both the first jitter component and the second jitter component are applied to each one of the series of video frames, and applying the selected jitter component to the transformation matrix of the vertex for an anti-aliased VR scene; and sending the anti-aliased VR scene for display on a display associated with the HMD;

wherein the anti-aliasing for a current video frame of the VR scene includes sampling from a plurality of previous video frames.

12. The method of claim 11, wherein the foveal region is associated with a resolution or image quality that is greater than that of the peripheral region.

13. The method of claim 11, wherein an offset associated with the first jitter component is smaller than an offset associated with the second jitter component.

14. The method of claim 11, wherein the foveal region is fixed relative to the display or the peripheral region.

15. The method of claim 11, wherein the peripheral region is displayed in regions of the display associated with the HMD where the foveal region is not displayed.

16. The method of claim 11, further comprising:
tracking a gaze of a user of the HMD;
wherein said generating the VR scene includes dynamically placing the foveal region within the display in accordance with a direction of the gaze of the user.

17. The method of claim 11, wherein the VR scene further includes an intermediate foveal region, and wherein a third jitter component is selected and applied to the vertex if the vertex is determined to be located in the intermediate foveal region;

wherein the intermediate foveal region is associated with a resolution or image quality that is greater than that of the peripheral region and less than that of the foveal region; and wherein an offset associated with the third jitter component is larger than an offset associated with the first jitter component and smaller than an offset associated with the second jitter component.

18. The method of claim 11, wherein said anti-aliasing for the current frame is performed by sampling code that translates a projection matrix associated respective of the plurality of previous video frames.

19. The method of claim 11, wherein said anti-aliasing for a video frame of the VR scene further includes sampling from a previous group of video frames of the VR scene.

20. The method of claim 11, wherein higher resolution of pixels is associated with more pixels in said foveal region that will be exposed to the first jitter component than pixels in said peripheral region that are exposed to the second jitter component.

21. A computer program embedded in a non-transitory computer-readable storage medium, when executed by one or more processors, for providing a virtual reality (VR) scene with anti-aliasing for presentation on a head mounted display (HMD), the computer program comprising:

program instructions for rendering a VR scene including a series of video frames that includes a foveal region of the video frame and a peripheral region of the video frame;

program instructions for applying anti-aliasing to the foveal region of the video frame using a first jitter offset having a first magnitude for an anti-aliased foveal region;

program instructions for applying anti-aliasing to the peripheral region of the video frame using a second jitter offset having a second magnitude for an anti-aliased peripheral region, the foveal region having a higher resolution of pixels than the peripheral region;

program instructions for sending the VR scene having the anti-aliased foveal region and the anti-aliased peripheral region for presentation on a display associated with the HMD, and wherein the first magnitude of the first jitter offset is smaller than the second magnitude of the second jitter offset, and both the first jitter offset and the second jitter offset are applied to a transformation matrix used for anti-aliasing each one of the series of video frames, and wherein the anti-aliasing for a current video frame of the VR scene includes sampling from a plurality of previous video frames.

22. The computer program of claim 21, wherein the foveal region is fixed relative to the display associated with the HMD or is fixed relative to the peripheral region.

23. The computer program of claim 21, further comprising:

program instructions for tracking a gaze of a user of the HMD, wherein said generating the VR scene includes dynamically placing the foveal region within the display associated with the HMD in accordance with a direction of the gaze of the user.

24. The computer program of claim 21, wherein higher resolution of pixels is associated with more pixels in said foveal region that will be exposed to the first jitter offset than pixels in said peripheral region that are exposed to the second jitter offset.

* * * * *